United States Patent
Dayan et al.

(10) Patent No.: US 10,180,989 B2
(45) Date of Patent: Jan. 15, 2019

(54) GENERATING AND EXECUTING QUERY LANGUAGE STATEMENTS FROM NATURAL LANGUAGE

(71) Applicant: International Business Machines Corporation, Armonk, NY (US)

(72) Inventors: Yigal S. Dayan, Jerusalem (IL); Josemina M. Magdalen, Jerusalem (IL); Irit Maharian, Tzur Hadasa (IL); Victoria Mazel, Jerusalem (IL); Oren Paikowsky, Jerusalem (IL); Andrei Shtilman, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 14/808,138

(22) Filed: Jul. 24, 2015

(65) Prior Publication Data
US 2017/0024443 A1 Jan. 26, 2017

(51) Int. Cl.
*G06F 17/30* (2006.01)

(52) U.S. Cl.
CPC .... *G06F 17/30867* (2013.01); *G06F 17/3043* (2013.01); *G06F 17/30672* (2013.01); *G06F 17/30684* (2013.01)

(58) Field of Classification Search
CPC .......... G06F 17/30867; G06F 17/3043; G06F 17/30672; G06F 17/30684
See application file for complete search history.

(56) References Cited

U.S. PATENT DOCUMENTS

| | | | |
|---|---|---|---|
| 5,265,065 A | 11/1993 | Turtle | |
| 6,182,029 B1 | 1/2001 | Friedman | |
| 6,516,312 B1 | 2/2003 | Kraft | |
| 6,631,346 B1 | 10/2003 | Karaorman et al. | |
| 7,236,972 B2 * | 6/2007 | Lewak | G06F 17/30389 |
| 7,548,847 B2 | 6/2009 | Acero | |

(Continued)

OTHER PUBLICATIONS

Tablan et al., "A Natural Language Query Interface to Structured Information", Department of Computer Science, University of Sheffield, pp. 1-15, 2008.

(Continued)

*Primary Examiner* — Noosha Arjomandi
(74) *Attorney, Agent, or Firm* — Joseph Polimeni; Edell, Shapiro & Finnan, LLC

(57) ABSTRACT

Techniques for generating query language statements for a document repository are described herein. An example method includes detecting a search query corresponding to a document repository and generating a modified search query by adding atomic tags to the search query, the atomic tags being based on prior knowledge obtained by static analysis of the document repository and semantic rules. The method also includes generating enriched tags based on combinations of the atomic tags and any previously identified enriched tags and generating a first set of conditions based on combinations of the atomic tags and the generated enriched tags and generating a second set of conditions based on free-text conditions. The method also includes generating the query language statements based on the first set of conditions and the second set of conditions and displaying a plurality of documents from the document repository that satisfy the query language statements.

18 Claims, 6 Drawing Sheets

(56) References Cited

U.S. PATENT DOCUMENTS

| | | | |
|---|---|---|---|
| 7,983,914 B2 | 7/2011 | Eckhart et al. | |
| 8,688,447 B1 | 4/2014 | De | |
| 8,694,305 B1 | 4/2014 | Grove | |
| 8,700,404 B1 | 4/2014 | Chotimongkol | |
| 8,914,277 B1 | 12/2014 | Liu | |
| 2003/0126136 A1* | 7/2003 | Omoigui | G06F 17/3089 |
| 2003/0212664 A1* | 11/2003 | Breining | G06F 17/30914 |
| 2004/0015548 A1 | 1/2004 | Lee | |
| 2004/0153435 A1* | 8/2004 | Gudbjartsson | G06F 17/30595 |
| 2006/0053096 A1* | 3/2006 | Subramanian | G06F 17/30398 |
| 2006/0074634 A1 | 4/2006 | Gao | |
| 2006/0106769 A1* | 5/2006 | Gibbs | G06F 17/276 |
| 2008/0097748 A1* | 4/2008 | Haley | G06F 17/2785 704/9 |
| 2008/0133479 A1* | 6/2008 | Zelevinsky | G06F 17/3071 |
| 2010/0049502 A1 | 2/2010 | Oppenheim et al. | |
| 2010/0076972 A1 | 3/2010 | Baron | |
| 2010/0104087 A1 | 4/2010 | Byrd | |
| 2010/0145902 A1 | 6/2010 | Boyan et al. | |
| 2010/0293195 A1 | 11/2010 | Houghton | |
| 2011/0224982 A1 | 9/2011 | Acero et al. | |
| 2011/0313757 A1 | 12/2011 | Hoover et al. | |
| 2011/0320203 A1 | 12/2011 | Reich | |
| 2012/0166182 A1* | 6/2012 | Ko | G06F 17/276 704/9 |
| 2012/0215533 A1 | 8/2012 | Aravamudan et al. | |
| 2012/0323574 A1 | 12/2012 | Wang et al. | |
| 2013/0006613 A1 | 1/2013 | Zangvil | |
| 2013/0080152 A1 | 3/2013 | Brun et al. | |
| 2013/0166598 A1* | 6/2013 | Vaitheeswaran | G06F 17/30566 707/792 |
| 2013/0332162 A1 | 12/2013 | Keen | |
| 2014/0012580 A1 | 1/2014 | Ganong | |
| 2014/0019435 A1* | 1/2014 | Ceri | G06F 17/30864 707/712 |
| 2014/0093845 A1 | 4/2014 | Kim et al. | |
| 2014/0129218 A1 | 5/2014 | Liu et al. | |
| 2014/0163959 A1 | 6/2014 | Hebert et al. | |
| 2014/0201202 A1 | 7/2014 | Jones et al. | |
| 2014/0244246 A1 | 8/2014 | Nutaro et al. | |
| 2014/0330819 A1 | 11/2014 | Raina et al. | |
| 2014/0344173 A1* | 11/2014 | Jayade | G06Q 10/06316 705/317 |
| 2015/0046371 A1 | 2/2015 | Leary | |
| 2015/0081658 A1* | 3/2015 | Meyles | G06F 17/30501 707/706 |
| 2016/0012020 A1 | 1/2016 | George et al. | |
| 2016/0371392 A1* | 12/2016 | Brown | G06F 17/30911 |
| 2017/0024431 A1 | 1/2017 | Dayan et al. | |
| 2017/0024459 A1 | 1/2017 | Dayan et al. | |
| 2017/0025120 A1 | 1/2017 | Dayan et al. | |

OTHER PUBLICATIONS

Androutsopoulos et al., "Natural Language Interfaces to Databases—An Introduction", arXiv:cmp-Ig/9503016v2, Mar. 16, 1995, pp. 1-50.

Michael Tjalve., "Accent Features and Idiodictionaries: On Improving Accuracy for Accented Speakers in ASR", University College London , PhD in Experimental Phonetics, Mar. 2007, 236 pages.

Yanli Zheng et al., "Accent Detection and Speech Recognition for Shanghai-Accented Mandarin", INTERSPEECH, 2005, pp. 217-220.

CucerZan, et al., "Spelling correction as an iterative process that exploits the collective knowledge of web users", Retrieved at http://acl.ldc.upenn.edu/acl2004/emnlp/pdf/CucerZan.pdf >>, Proceedings of the 2004 Conference on Empirical Methods in Natural Language Processing, a meeting of SIGDAT, a Special Interest Group of the ACL, held in conjunction with ACL, Jul. 25-26, 2004, pp. 8.

List of IBM Patents or Patent Applications Treated as Related, Jul. 24, 2015, 1 page.

List of IBM Patents or Patent Applications Treated as Related, Apr. 28, 2016.

List of IBM Patents or Patent Applications Treated as Related, May 4, 2016, 2 pages.

\* cited by examiner

GENERATING AND EXECUTING QUERY LANGUAGE STATEMENTS FROM NATURAL LANGUAGE

BACKGROUND

The present invention relates to query language statements, and more specifically, but not exclusively, to generating and executing query language statements.

SUMMARY

According to an embodiment described herein, a method for generating query language statements for a document repository comprises detecting, via a processor, a search query corresponding to a document repository. The method can also include generating, via the processor, a modified search query by adding atomic tags to the search query, the atomic tags being based on prior knowledge obtained by static analysis of the document repository and semantic rules. Additionally, the method can include generating, via the processor, enriched tags based on combinations of the atomic tags and any previously identified enriched tags and adding the generated enriched tags to the modified search query. Furthermore, the method can include generating, via the processor, a first set of conditions based on combinations of the atomic tags and the generated enriched tags and generating a second set of conditions based on free-text conditions and reconciling, via the processor, the first set of conditions based on identified contradictions. The second set of conditions can correspond to terms of the search query that are not associated with any of the first set of conditions, which can result in a more focused and accurate retrieval of the relevant documents. The method can also include generating, via the processor, the query language statements corresponding to the search query, the query language statements based in part on the first set of conditions and the second set of conditions, and displaying, via the processor, a plurality of documents from the document repository that satisfy the query language statement.

According to another embodiment, a system for generating a query language statement can include a processor to detect a search query corresponding to a document repository and generate a modified search query by adding atomic tags to the search query, the atomic tags being based on an entity list, and semantic rules. The processor can also generate enriched tags based on combinations of the atomic tags and any previously identified enriched tags and add the generated enriched tags to the modified search query. The processor can also generate a first set of conditions based on combinations of the atomic tags and the generated enriched tags and generate a second set of conditions based on free-text conditions. Furthermore, the processor can reconcile the first set of conditions based on identified contradictions and generate the query language statements corresponding to the search query, the query language statements based in part on the first set of conditions and the second set of conditions. The second set of conditions can correspond to terms of the search query that are not associated with any of the first set of conditions, which can result in a more focused and accurate retrieval of the relevant documents. Moreover, the processor can display a plurality of documents from the document repository that satisfy the query language statement.

In yet another embodiment, a computer program product for generating a query language statement can include a computer readable storage medium having program instructions embodied therewith, wherein the computer readable storage medium is non-transitory. The program instructions, when executed by a processor, can cause the processor to detect, via the processor, a search query corresponding to a document repository and generate, via the processor, a modified search query by adding atomic tags to the search query, the atomic tags being based on prior knowledge obtained by static analysis of the document repository and semantic rules. The program instructions can also cause the processor to generate, via the processor, enriched tags based on combinations of the atomic tags and any previously identified enriched tags and add the generated enriched tags to the modified search query. A first set of conditions based on combinations of the atomic tags and the generated enriched tags and a second set of conditions based on free-text conditions may also be generated via the processor. The program instructions can also cause the processor to reconcile, via the processor, the first set of conditions based on identified contradictions and generate, via the processor, the query language statements corresponding to the search query, the query language statements based in part on the first set of conditions and the second set of conditions. The second set of conditions can correspond to terms of the search query that are not associated with any of the first set of conditions, which can result in a more focused and accurate retrieval of the relevant documents. Furthermore, the program instructions can cause the processor to display, via the processor, a plurality of documents from the document repository that satisfy the query language statement based on a score.

DETAILED DESCRIPTION

Figure 1:
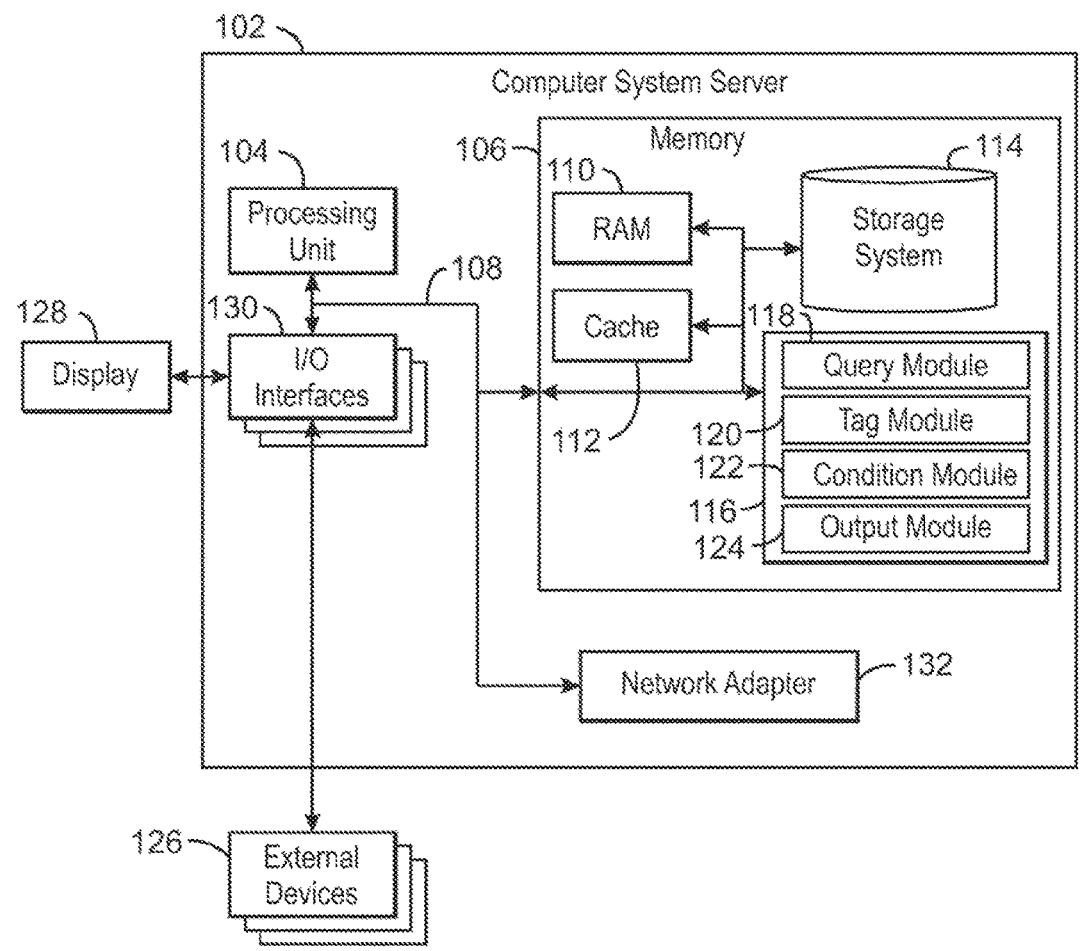
FIG. 1 depicts a block diagram of a cloud computing node that can generate a query language statement according to an embodiment described herein.

Retrieving data from document repositories based on natural language search queries can be imprecise and cumbersome. For example, a natural language search query can include ambiguous words or phrases that prevent the search query from identifying the appropriate documents. The techniques described herein convert a natural language search query (also referred to as a search query) into formal constraints based on repository content and structure (as determined by the repository static analysis), domain knowledge, personal information, and rules. The formal constraints can be used to generate a query language statement to retrieve and display documents from a document repository.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node that can generate a query language statement is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 102 may be described in the general context of computer system—executable instructions, such as program modules, being executed by a computer system. Generally, program modules may include routines, programs, objects, components, logic, data structures, and so on that perform particular tasks or implement particular abstract data types. Computer system/server 102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 102 in cloud computing node 100 is shown in the form of a general-purpose computing device. The components of computer system/server 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 102 typically includes a variety of computer system readable media. Such media may be any available media that is accessible by computer system/server 102, and it includes both volatile and non-volatile media, removable and non-removable media.

System memory 106 can include computer system readable media in the form of volatile memory, such as random access memory (RAM) 110 and/or cache memory 112. Computer system/server 102 may further include other removable/non-removable, volatile/non-volatile computer system storage media. By way of example only, storage system 114 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 108 by one or more data media interfaces. As will be further depicted and described below, memory 106 may include at least one program product having a set (e.g., at least one) of program modules that are configured to carry out the functions of embodiments of the invention.

Program/utility 116 having a set (at least one) of program modules, such as a query module 118, a tag module 120, condition module 122, and an output module 124 may be stored in memory 106 by way of example, and not limitation, as well as an operating system, one or more application programs, other program modules, and program data. Each of the operating system, one or more application programs, other program modules, and program data or some combination thereof, may include an implementation of a networking environment. The query module 118, tag module 120, condition module 122, and output module 124 generally carry out the functions and/or methodologies of embodiments of the invention as described herein.

Computer system/server 102 may also communicate with one or more external devices 126 such as a keyboard, a pointing device, a display 128, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 130. Still yet, computer system/server 102 can communicate with one or more networks such as a local area network (LAN), a general wide area network (WAN), and/or a public network (e.g., the Internet) via network adapter 132. As depicted, network adapter 132 communicates with the other components of computer system/server 102 via bus 108. It should be understood that although not shown, other hardware and/or software components could be used in conjunction with computer system/server 102. Examples, include, but are not limited to: microcode, device drivers, redundant processing units, external disk drive arrays, RAID systems, tape drives, and data archival storage systems, etc.

In some embodiments, the query module 118 can detect a search query corresponding to a document repository. A document repository, as referred to herein, can include any collection of emails or documents, and the like. A document repository may not include a collection of websites in some examples. The search query can attempt to retrieve documents from the document repository based on words or conditions in the search query.

In some embodiments, the tag module 120 can generate a modified search query by adding atomic tags to the search query, the atomic tags based on prior knowledge obtained by static analysis of the document repository, semantic-aware rules and enrichment rules (also referred to as "the Enrichment Rules Engine"). For example, the tag module 120 can analyze the document repository to detect prior knowledge, such as a multitude of various fields with specific meaning, and generate specific word and phrases lists (also referred to herein as entity lists) from the document repository. The entity lists can relate to certain aspects of the domain or document repository, which can include atomic tags that indicate associations between terms in a search query and additional related terms. In some embodiments, the tag module 120 can also generate enriched tags based on combinations of previously found atomic tags and add the enriched tags to the modified search query. The enriched tags can include any suitable combination of atomic tags and previously identified enriched tags. For example, the enriched tags can include consecutive atomic tags, or any other suitable sequence of atomic and previously identified enriched tags.

In some embodiments, the condition module 122 (also referred to as the "Condition Rules Engine") can generate a set of atomic conditions based on the enriched tags from the tag module 120. The condition module 122 contains a "Condition Rules Engine" and the logic to combine the atomic conditions into an abstract condition structure. In some examples, the condition module 122 can add free text search constraints for a portion of a query that is not covered by abstract conditions and boiler-plate phrases. The free-text constraints are used to search entire documents for terms from the search query that do not match the atomic conditions. Unlike typical search engines, the free text conditions can be limited to those parts of the query that have not been otherwise covered by the conditions found in the "Enrichment Rules Engine". This increases the accuracy of the results. Based on the set of atomic conditions, a combination of conditions is generated, in such a way that the atomic conditions do not contradict each other. In some examples, the condition module 122 can also reconcile the combination of conditions based on identified contradictions. For example, the condition module 122 can detect that certain combinations of conditions are illogical. Accordingly, the condition module 122 can indicate that the combination of the conditions is invalid and should be reorganized in order to reconcile a contradiction between conditions. For example, an "and" condition can be converted into an "or" condition.

In some embodiments, the output module 124 can generate the query language statements corresponding to the search query, the query language statements based on the generated condition by the condition module and display, via the processor, a plurality of documents from the document repository that satisfy the query language statements.

It is to be understood that the block diagram of FIG. 1 is not intended to indicate that the computing system/server 102 is to include all of the components shown in FIG. 1. Rather, the computing system/server 102 can include fewer or additional components not illustrated in FIG. 1 (e.g., additional memory components, embedded controllers, additional modules, additional network interfaces, etc.). Furthermore, any of the functionalities of the query module 118, tag module 120, condition module 122, and output module 124 may be partially, or entirely, implemented in hardware and/or in the processing unit (also referred to herein as processor) 104. For example, the functionality may be implemented with an application specific integrated circuit, or in logic implemented in the processor 104, among others.

Figure 2:
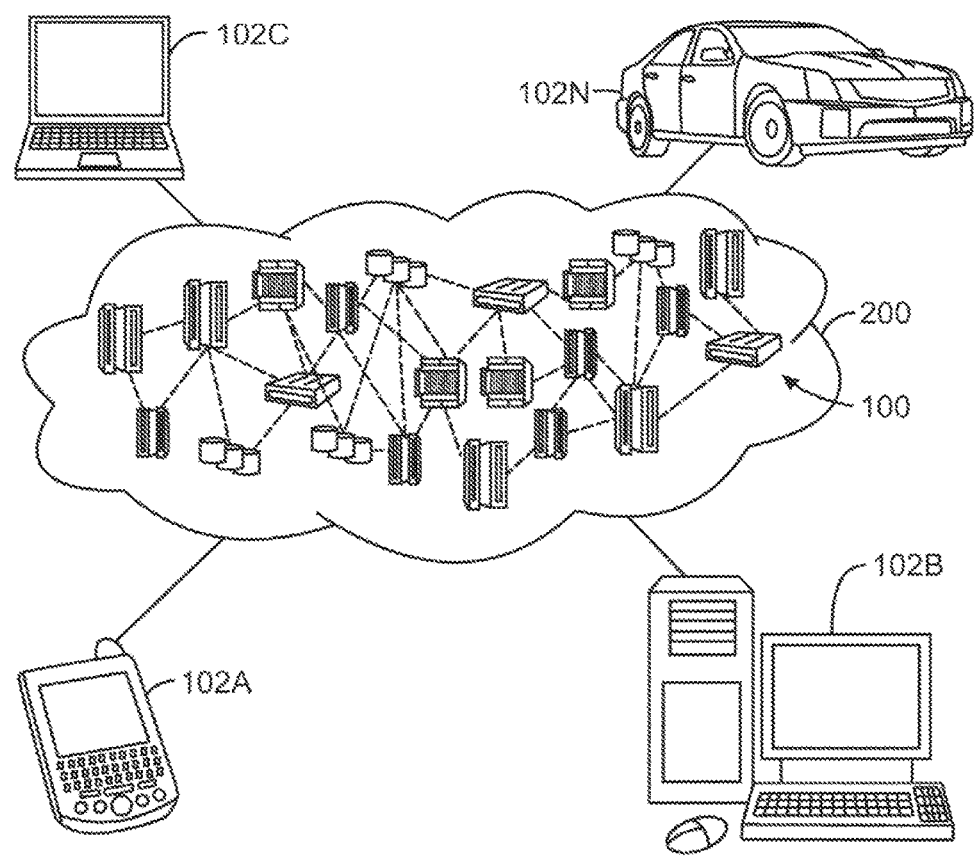
FIG. 2 depicts a cloud computing environment that can generate a query language statement according to an embodiment described herein.

Referring now to FIG. 2, illustrative cloud computing environment 200 that can generate a query language statement is depicted. As shown, cloud computing environment 200 comprises one or more cloud computing nodes 100 with which local computing devices used by cloud consumers, such as, for example, personal digital assistant (PDA) or cellular telephone 102A, desktop computer 102B, laptop computer 102C, and/or automobile computer system 102N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 102A-N shown in FIG. 2 are intended to be illustrative only and that computing nodes 100 and cloud computing environment 200 can communicate with any type of computerized device over any type of network and/or network addressable connection (e.g., using a web browser, among others).

Figure 3:
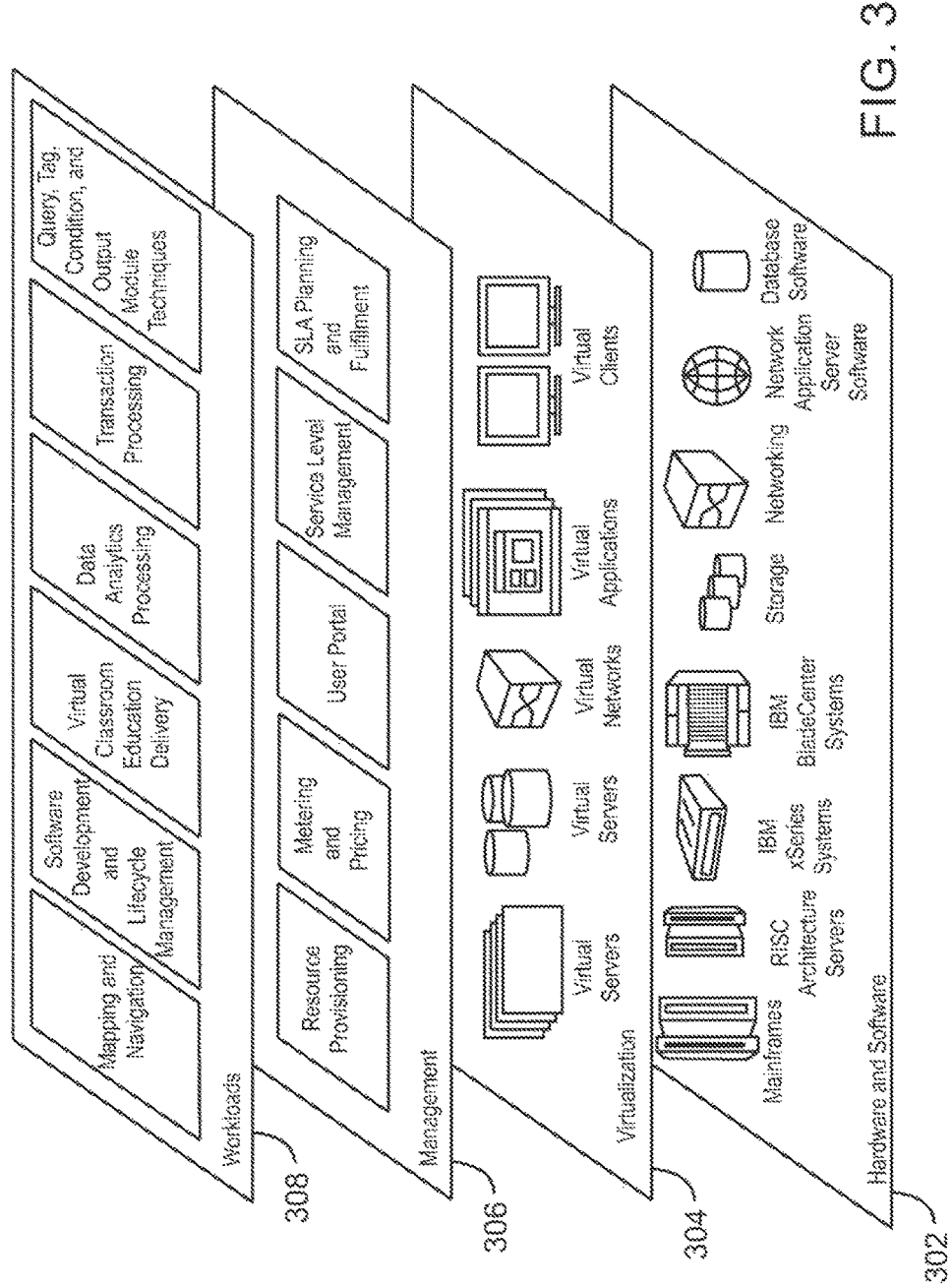
FIG. 3 depicts abstraction model layers used to implement techniques for generating a query language statement according to an embodiment described herein.

Referring now to FIG. 3, a set of functional abstraction layers used to implement techniques for generating a query language statement provided by cloud computing environment 200 (FIG. 2) and node 100 (FIG. 1) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 302 includes hardware and software components. Examples of hardware components include mainframes, in one example IBM® ZSERIES systems; RISC (Reduced Instruction Set Computer) architecture based servers, in one example IBM PSERIES systems; IBM XSERIES systems; IBM BLADECENTER systems; storage devices; networks and networking components. Examples of software components include network application server software, in one example IBM WEBSPHERE application server software; and database software, in one example IBM DB2 database software. (IBM, ZSERIES, PSERIES, XSERIES, BLADECENTER, WEBSPHERE, AND DB2 are trademarks of International Business Machines Corporation registered in many jurisdictions worldwide).

Virtualization layer 304 provides an abstraction layer from which the following examples of virtual entities may be provided: virtual servers; virtual storage; virtual networks, including virtual private networks; virtual applications and operating systems; and virtual clients.

In one example, management layer 306 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 308 provides examples of functionality for which the cloud computing environment may be utilized. Examples of workloads and functions which may be provided from this layer include: mapping and navigation; software development and lifecycle management; virtual classroom education delivery; data analytics processing; transaction processing; and techniques performed by the query module 118, tag module 120, output module 124, and condition module 122.

Figure 4:
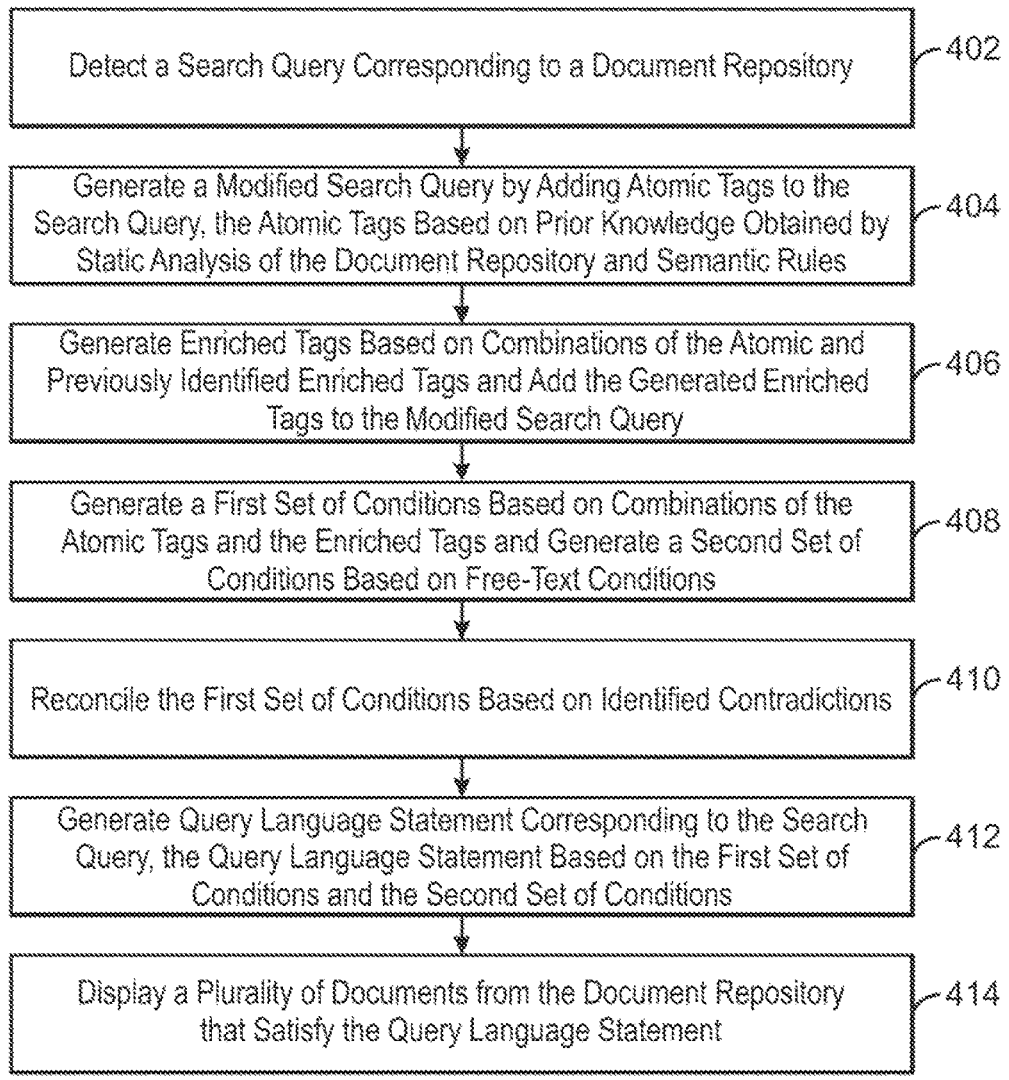
FIG. 4 is a process flow diagram of an example method that can generate a query language statement according to an embodiment described herein.

FIG. 4 is an example of a method that can generate a query language statement. The method 400 can be implemented with any suitable computing device, such as the computing system/server 102 of FIG. 1.

At block 402, a query module 118 can detect a search query corresponding to a document repository. In some embodiments, the document repository can include a collection of emails, a collection of documents, and the like. In some embodiments, the search query can be a request to locate data stored in the document repository. For example, the search query may include a word, phrase, date, or any other suitable information that can be used to identify documents to be retrieved. In some embodiments, the document repository may not correspond to a collection of websites.

At block 404, the tag module 120 can generate a modified search query by adding atomic tags to the search query, the atomic tags being based on prior knowledge obtained by static analysis of the document repository and semantic rules. For example, the tag module 120 can detect structured data conditions based on atomic tags that are to be added to the search query to increase the probability of identifying the documents corresponding to the search query. In some examples, the atomic tags can be based on prior knowledge obtained by static analysis of the document repository such as previously generated entities lists, facets, and relationship between entities. A facet, as referred to herein, can include a document repository field that contains a restricted number of values. To discover facets, the document repository may be processed in advance to identify facets as well as non-facet metadata fields that have a limited range of values and can therefore be considered to be facets. A 'facet' word list may be created automatically from the limited list of values or enums. The entity lists can associate any suitable number of words or phrases from the search query with additional terms that share a common characteristic. In addition, the tag module 120 can include an "enrichment rules engine" that may make use of semantic knowledge, for example words associated with a time period such as the terms minute, hour, day, week, month, quarter, and year, among others. Similarly, a word list may include various words associated with months such as January, February, March, etc. In some embodiments, any suitable number of word lists can be generated and searched for associated terms to be used as atomic tags for the search query. Accordingly, each term or phrase in the search query can be tagged or associated with any number of terms identified from an entities list or any other suitable source for tagging the search query or any combination thereof. In some embodiments, the tag module 120 can include a finite state machine that tags the terms of the search query.

In some embodiments, the atomic tags are also identified based on semantic rules. The Enrichment Rules Engine, as referred to herein, can include a name of an action to invoke, followed by conditions that trigger the action. In some embodiments, the tag module 120 can detect a semantic rule that results in the generation of an enriched atomic tag. The Enrichment Rule Engine is described in greater detail below in relation to FIG. 5.

At block 406, the tag module 120 can generate enriched tags based on combinations of the existing (e.g., atomic and enriched) tags and add the generated enriched tags to the modified search query. In some examples, the enriched tags can include a combination or sequence of existing tags. For example, the enriched tags can indicate a relationship between consecutive atomic and/or enriched tags. As discussed above, in some embodiments, each existing tag in a rule can represent a semantic group or an entities list. In some examples, each word in the modified search query can be associated with any suitable number of atomic and/or enriched tags.

At block 408, the condition module 122 can generate a first set of conditions based on combinations of the atomic and enriched tags and generate a second set of conditions based on free-text conditions. For example, the first set of conditions can indicate logical expressions that are to be satisfied by the enriched tags. The conditions can be derived from atomic and/or enriched tags that indicate date ranges, numerical ranges, and the like. In some embodiments, terms in the search query may not be associated with a tag. The terms not associated with a tag can be searched within documents using free-text conditions. For example, the terms that are not associated with a tag can be used in a text search within the document repository. Accordingly, the second set of conditions can be restricted to the parts of the query that are not covered by the first set of conditions, which results in a more focused and accurate retrieval of the relevant documents.

At block 410, the condition module 122 can reconcile the first set of conditions based on identified contradictions. For example, two or more conditions from the first set of conditions may violate a logical presumption or expression. In some embodiments, the condition module 122 can reconcile the first set of conditions by recombining atomic conditions so that they will not contradict each other. For example, atomic conditions can be recombined using "or" conditions rather than "and" conditions and vice versa.

At block 412, the output module 124 can generate query language statements corresponding to the search query. In some embodiments, the query language statements can be based on the structured and free form conditions. For example, the output module 124 can use the structured and free form conditions to detect any suitable number of fields in the document repository that are to be searched for documents satisfying the search query. In some embodiments, the output module 124 may detect a separate query language statement for each field of the document repository and combine the query language statements in any suitable fashion. For example, the query language statements can be joined conjunctively, disjunctively, or any combination thereof.

At block 414, the output module 124 can display a plurality of documents from the document repository that satisfy the query language statement. For example, the output module 124 can display any suitable number of documents from the document repository that match conditions associated with the query language statements. In some examples, the output module 124 can determine results of the query language statements that do not exceed a quality threshold, generate relaxation rules, and modify the query language statement based on the relaxation rules. The quality threshold can indicate whether the documents returned from the document repository include relevant information pertaining to the search query. In some embodiments, the relaxation rules can broaden the query language statement to return a larger number of documents from the document repository. Additional information pertaining to techniques for generating modified search queries, tags, and query language statements are included below in relation to FIG. 5.

The method 400 can include any suitable number of additional operations. For example, the output module 124 can also generate a score for the query language statement, wherein the score corresponds to a characteristic of the search query. In some embodiments, the score indicates that the search query references a field search term or a document search term, the score indicating a preference for search query language statements that correspond to the field search term. For example, the score can indicate that the terms of the search query correspond to more of the first set of conditions related to combinations of atomic and enriched tags than the second set of conditions related to free-text conditions. In some examples, a field search term corresponds to a condition based on tags, while a document search term corresponds to a free-text condition. In other embodiments, the query language statement comprises joining at least two queries for documents of a same type with a logical disjunction or at least two queries for documents of a different type with a logical conjunction.

Figure 5:
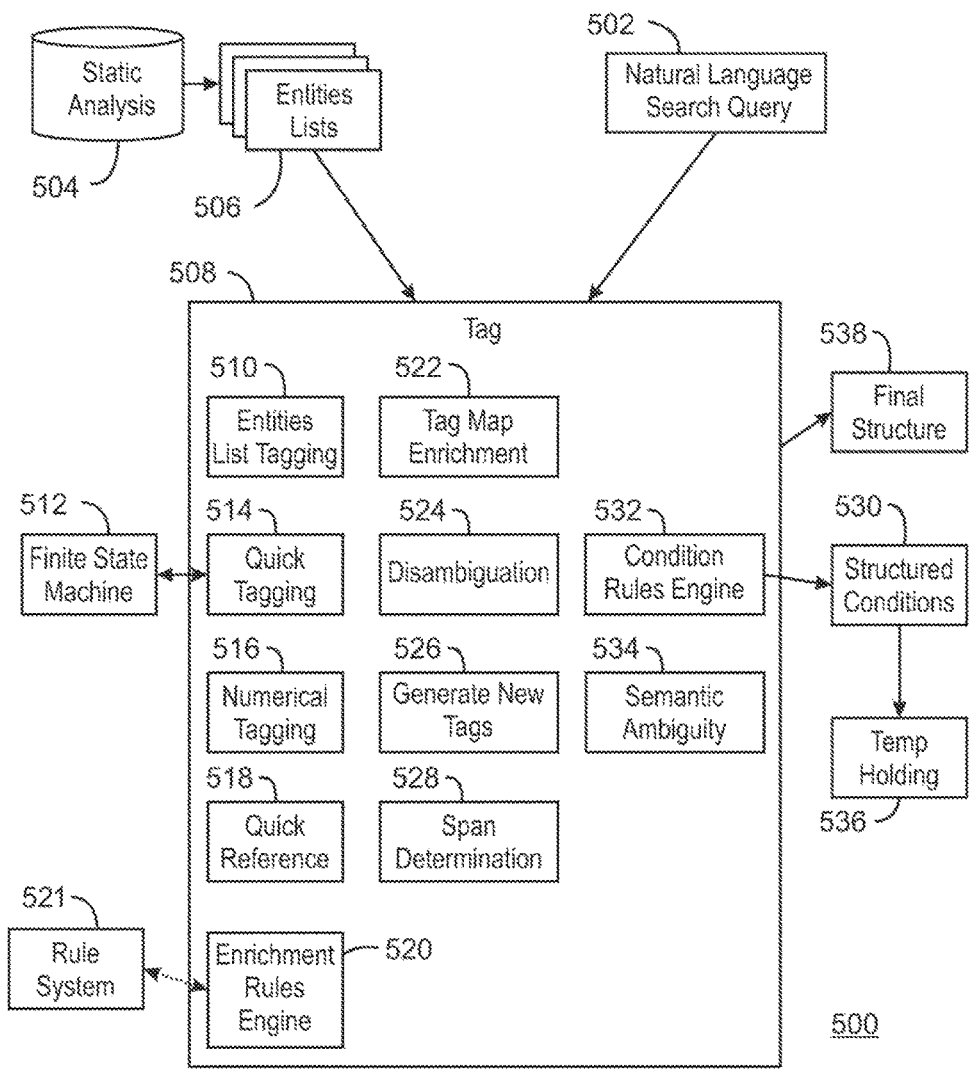
FIG. 5 is a block diagram illustration of an example system for generating a query language statement according to an embodiment described herein.

FIG. 5 is a process flow diagram illustrating techniques for generating a query statement using a tag module. The method 500 of FIG. 5 can be implemented with any suitable computing device such as the computing system/server 102 of FIG. 1.

In some embodiments, a query module, such as the query module 118 of FIG. 1, can detect a natural language search query 502 and send the natural language search query 502 to a tag module 508. In some examples, the tag module 508 can be implemented with any suitable module such as the tag module 120 of FIG. 1. The natural language query can include any suitable number of words written in a natural language that are to be used for a search query. A search query can request information from a document repository, storage devices, or the internet, and the like. The tag module 508 can generate a query language statement by performing various techniques such as entities list tagging 510, quick tagging 514, numerical tagging 516, quick reference tagging 518, Enrichment Rules Engine tagging 520, tag map 522, disambiguation 524, generating new tags 526, span determination 528, Condition Rules Engine tagging 532, and semantic ambiguity tagging 534. These various tagging techniques are described in greater detail below.

As discussed above, the tag module 508 can generate a modified search query by adding structured data (also referred to herein as tags) to the search query. Tags can include any suitable terms or logical expressions that can be added to the natural language query. The tags can improve the accuracy of the results returned by performing a search. In some embodiments, the tags can be based on word lists (also referred to herein as entities lists) 506 from a static analysis database 504 and semantic rules. The tag module 508 can use entities list tagging 510 by using entities lists 506 to tag and parse the natural language query 502. For example, the tag module 508 can tag the natural language search query 502 based on a word and/or phrase list that can be predefined or predetermined for a document repository. Each entities list 506 may represent a tag and query words that may be found tagged by an identifier for each word list 506. For example, a word list "period.txt" may contain the terms "minute," "hour," "day," "week," "month," "quarter," "year," and the like. In another example, a word list "month.txt" may contain the words "January," "February," "March," etc. If a word or phrase from a word list 506 is found in the natural language search query 502, the word or phrase may be tagged with a list name. For example, a natural language search query 502 containing "the email sent last week of January" may be tagged "the email sent last <TIME QUALIFIER> week <PERIOD> of January <MONTH>."

In some examples, a text word or phrase may correspond to several tags and each word or phrase in a word list 506 may be associated with a more abstract entity depending on the concept that the word list represents. For example, a word list 506 may be identified as "date_near.txt" containing the following words and phrases and numerical qualifiers: "the day before yesterday; −2," yesterday; −1," "today; 0," "tomorrow; +1," "the day after tomorrow; +2," and the like. In this example, each word or phrase is mapped to a number representing an offset from "today." This number is available within the generated tag for subsequent date calculations.

Another example of entities list tagging 510 by the tag module 508 can include identifying various writings of the same name that appear in the natural language search query 502. For example, a name may be shortened to a nickname, rather than a full name. In this scenario, a name list among the word lists 506 may include "nicknames.txt" containing two fields in each line, wherein the first field includes the word as encountered in the query and the second field includes an alias for the word from a document repository such as the static analysis resource 504 (e.g., this information is not crafted manually but generated automatically by the static analysis). For example, the "nicknames.txt" word list may include "alex; alexis," "allie: alice," "elsie; alice;" "lisa; alice," "allie; alicia," "elsie; alicia," "lisa; alicia," and the like.

In some examples, an entity list among the entity lists 506 may include phrases that generate an open ended date range. For example, a word list may include words or phrases such as "later than," "no later than," "no sooner than," and the like. In this scenario, tagging may contain information to facilitate generation of an open range, such as which side of the range should be opened, whether the boundary is included or excluded from the range, and so on.

In some embodiments, the tag module 508 can use a finite state machine 512 to generate tags using quick tagging 514 techniques. For example, the finite state machine 512 can generate tags that include a tag name, such as "date_near_tag," a tag value, such as "yesterday," and in some cases a mapping or numerical value, such as "−1," as well as a location/span of the tag in the natural language search query 502. For example, if a natural language search query 502 includes "the day before yesterday," two "date_near_tag" tags may be generated by the finite state machine 512. The two "date_near_tag" tags may include one with the value "the day before yesterday," the mapping of "−2," and a location from word number one of the search query 502 to word number four of the search query 502. An additional tag can also include a value "yesterday," the mapping "−1," and the location from word number four to word number four of the search query 502.

In some embodiments, the tag module 508 can also implement numerical tagging 516. For example, the tag module 508 can scan the natural language search query 502 for numbers and generate appropriate numeric tags. In this example, sequences identified as numbers are tagged with a "number" tag, and mapped to the associated number. In some cases, numbers may also be tagged as "number_cardinal," "number_ordinal," "day," "day_cardinal," "day_ordinal," "year," and the like. For example, the phrase "3rd" may be tagged with the tags "number" and "number_ordinal." To generate these tags, a tag module 508, such as the tag module 120 of FIG. 1, may make use of mappings found by previously generated tags. For example, the text phrase "twenty-three" may already be tagged by a word list at block 510 with the mapping "23." Further, in some cases, short matches may be removed in favor of longer ones. For example, adjacent numeric phrases such as "two-hundred" "and" "twenty three" may be combined into a single number.

In some embodiments, the tag module 508 can also set a quick reference 518. In some examples, each detected tag name can be mapped to a list of corresponding tags. For example, a "date_near_tag" tag name may be mapped to multiple corresponding tags. Specifically, a tag for "yesterday" and a tag for "the day before yesterday" can be mapped or associated together.

In some examples, the tag module 508 can generate tags using a finite state machine (FSM) 512. In this embodiment, the tag module 508 may be relatively quick tagging a natural language search query 502 in comparison to non-finite state machine 512 based tagging. The FSM 512 may be used in conjunction with quick tagging 514 techniques. In some examples, the quick tagging 514 may be generated via the FSM 512 based on word lists. In this example, a single pass on the natural language search query with the FSM 512 can tag the words and phrases of the natural language search query 502 with the words and/or phrases in one or more of the word lists 506.

In some examples, the tag module 508 can use a rule engine 520 to generate a rule system 521 that searches for sequences of tags and/or original words from the natural language search query 502. The rule system 521 can include any number of rules that can detect adjacent tags that are at a given proximity from each other. For example, a word list from among the word lists 506 may be "next_last.txt" containing the phrase "the last," or similar. A second word list from the word lists 506 may be "periods.txt" as defined above. A rule (<Action>, . . . last, next, Number_Cardinal, periods) may be added to the rule engine 520 that can find word sequences such as "the next five weeks" or "the last thirty days." Each tag name specified in the rule represents a semantic group or a word list. The rule searches for any words or phrases from the first word list which are followed by any words or phrases from the second word list, and so on. More specifically, the rule can detect occurrences of the tags from a tag map or sequence of tags, and compatible tag combinations. When a match is found (tag conditions are identified) an action can be triggered by a rule. In short, the rule finds valid combinations of tags, and for each combination of tags, the rule triggers an action passing the combination of tags as input for the action.

In some embodiments, the rule engine 520 can include two types of engine actions. First, a new tag may be added to the tag map. The new tag may be available for matching by subsequent rules of the rules engine 520. Second, structured conditions may be generated that may later be used to formulate structured query language (SQL) queries that correspond to the natural language search query 502.

In some examples, a rule can contain a name of an action to invoke, followed by conditions that trigger the action. For example, a rule may include makeDate/simple; . . . date_near. In this rule, "date_near" may be a condition that was found in the natural language search query 502. The rule component "makeDate/simple" may be the action of this rule, meaning that a routine will be invoked to create a new <DATE> tag. This rule is triggered by a single condition: the existence of the tag "date_near." As discussed above, this tag is created when the natural language search query 502 contains such phrases as "the day before yesterday." When the rule is triggered, the tags included in the rule can be associated with the "makeDate" action. Besides triggering tags, the action can receive an optional context parameter, in this case the string "simple." In some examples, a generic "makeDate" action can use this context string to perform various tasks. In one example, a natural language search query 502 including "the day before yesterday" can result in the action being invoked twice, once for the tag that covers "yesterday" and once for the tag that covers "the day before yesterday." In one embodiment, the "makeDate" action results in an inspection of the tags corresponding to the natural language search query 502 (in this example a single "date_near" tag) and extraction of the mapping associated with the tag (in this example the offset from today).

In some examples, when invoked for "yesterday" the "makedate" action can find an offset value equal to negative one. For "the day before yesterday," the "makedate" action can detect an offset value equal to negative two. The "makedate" action can send the offset to a date utility that returns a time range structure denoted by two (begin, end) date structures: getPeriodRange (PERIOD period, int offset, int numberOfItems). This date utility receives a unit of time (day, month, week etc.), an offset from current time, and the number of time units requested. To receive a range for "the day before yesterday" a call getPeriodRange(PERIOD.DAY, −2, 1) can be initiated. The returned time range is delimited by (begin, end) dates. It is possible to create an open-ended time range by setting one of the two dates to a small or large constant.

In some examples, the tag module 508 can enrich a tag map as indicated at block 522. For example, the "makeDate" action can be used for enriching the tag map with a new DATE tag. A DATE tag contains, for example, in addition to the normal tag attributes, a structured date range object with start and end dates. In one example, the action is invoked twice, and two DATE tags are added to the tag map. The first tag has the same sentence location as the word "yesterday" (location word number four with a span to word number four) and includes a date range covering yesterday. The second tag has the same sentence location as the phrase "the day before yesterday" (location word number one with a span to word number four) and includes a date range for two days in the past.

In some embodiments, the tag module 508 can disambiguate 524 meanings by removing overlapping definitions. For example, since the phrase "the day before yesterday" may be preferred to the term "yesterday", the tag module 508 can periodically invoke a cleanup rule that scans DATE tags for overlaps and removes the shorter spans. This can be done by inserting a special action into the rules system: CLEANUP; DATE.

In some examples, the tag module 508 can generate new tags 526 based on previous findings. Generating new tags enables the incremental creation of complex expressions and creating new rules from tags. For example, once a DATE tag has been added to the tag map, subsequent rules can make use of the new DATE tag. In another example, the tag module 508 can generate a rule for flexible formatting of a date. For example, a context string may contain formatting characters. For a rule that finds nine/ninth of November 2012, the rule may include "formattedDate/DxmY; DAY; WORD/of; month; YEAR;" wherein DxmY are formatting characters. The syntax WORD/of indicates a search for an occurrence of the word "of" in the natural language search query 502. In another example, to parse "the first/last 2 weeks in this quarter", the tag module 508 can use the rule: "makeDate/period_in_period; first_last; NUMBER_CARDINAL; periods; in_of; DATE." In one example, this rule may be too broad. In general, rules can trigger illogical input phrases such as "the first two years of this month" or "the third month of January." Therefore, the tag module 508 performs an extra validation by determining the graininess of each period (whether the period is best expressed in days, weeks, months, quarters or years) and verifies that the first period fits within the second period. A new tag may be added if the two input periods are compatible.

In another example, generating a new tag 526 can include broadening or expanding a date range. For example, a phrase "no later than July of last year," can result in the generation of a rule that includes "extendDate/after_inclusive; phrase/no later than/2; DATE." In this rule, the syntax "/2" indicates a distance of one or two words between the phrase and the DATE tag is allowed. A context string is passed "after_inclusive" to the action to indicate that the open range should include the original date range (July is included in the date range).

In another example, generating new tags 526 can include adding inexact dates, such as dates matching "the end of July." In this example, a rule may include "makeDate/fuzzy; phrase/the end of; DATE." The actual end period used is configurable and depends on the size of the date range that is being modified. In another example, a single range may be formed from two date ranges. For example, the phrase "beginning on March the second and ending at the end of next April" may be used to form a single range. The rule may include "extendDate/merge_1×2; WORD/beginning; on_at; DATE; phrase/and ending; on_at; DATE." In this scenario, the rule may be generalized further by using tags that contain synonyms for "beginning" and "ending."

In some cases, the tag module 508 can determine the span 528 (sentence location) of a new tag for better accuracy in tag generation and disambiguation. Generally the span of a new tag is the span of the input conditions. For example, if "last" is at location (1,1) of the natural language search query 502 and "Friday" is at location (2,2) of the natural language search query 502, then the rule "makeWeekday;

next_last; weekday;" may generate a DATE tag with the location (1,2). The first number of the parenthetical can indicate the location of a word in the natural language search query 502 and the second number of the parenthetical can indicate location of a last word in the natural language search query 502.

In some embodiments, when interpreting the natural language search query 502, the resulting span may be less than the span of the conditions that generated it. For example, consider the phrases "created Friday" and "expires Friday". In the first example, the phrase "created Friday" refers to a past date while the phrase "expires Friday" refers to a future date. A date rule that has conditions associated with words that precede "Friday" can be useful, as long as these conditions are not a part of the new date tag. In one embodiment, the tag module 508 creates word lists, such as 'hint_past.txt' and 'hint_future.txt,' which indicate whether to expect a past or future date. Tags that start with 'hint_' help form the Rule Engine condition but do not contribute to the span of the new tag. The tag module 508 can then add two rules: "makeWeekday/future; hint_future//4; weekday;" and "makeWeekday/past; hint_past//4; weekday." These rules look for a past hint (e.g., 'created') or future hint (e.g., 'expires') four or less words before the weekday.

In some examples, an extra context parameter indicates if the makeWeekday action is to create a past or future date. For example, a word list such as 'hint_' can indicate not to include the first input span. The action can generate a correct DATE tag for "Friday" with the same location as the word "Friday". The new tag will take precedence over the word "Friday" during disambiguation.

As discussed above, the tag module 508 can generate structured conditions based on enriched tags, as indicated at block 530. A second rule engine 532 can include derived rules that trigger an action based on combinations of tags, wherein the actions create a set of structured conditions that can later serve as a base for SQL queries. For example, conditions for dates may include "dateCondition/date_sent_handler," "date_sent//4; DATE," wherein "date_sent" is a word list containing words such as send, sent, copied to, cc-ed. DATE is a time range discovered by the previous rule engine and inserted into the set of tags. If the word 'sent' is followed by a date at a maximum distance of 4, a condition is created on a date range by calling the dateCondition method. The tag module 508 can then receive a context parameter, 'date_sent_handler.' This string is a handle to a list of repository classes and attributes in the document repository that can be used to formulate the condition.

In some embodiments, documents can be added to the document repository accompanied by extensible markup language (XML) text that facilitates text search. In such examples, the tag module 508 can refer to a list of xpaths to be searched (rather than a list of fields to search). Specifying an abstract handle to attributes and xpaths allows a rigid separation between the universal rules and the document repository being queried. Repository-specific information can be sequestered separately, which enables connecting to new repositories without making any changes to generated rules.

In the example above, the definition for date_sent_handler may contain the repository information: "date_sent_handler; Email/SentOn; ICCMail3/ICCMailDate. In this example, two repository fields are mentioned. This indicates that the tag module 508 will be creating two conditions, one condition corresponding to the SentOn field in Email documents, and one condition that corresponds to the ICCMailDate field in ICCMail3 documents. Each generated date condition uses a calculated time range to specify a start and end time for the date field. At the final stage, the condition can be translated to a SQL statement such as: "WHERE (SentOn>=20130728T000000Z AND SentOn<=20130803T235959Z)."

Other examples of conditions generated by this rule engine 532 are discussed below. In some example, conditions may include documents sent from/to a specific person or having a specific mimetype or facet. As discussed above, a facet can include a document repository field that contains a restricted number of values. To discover facets, the document repository may be processed in advance to identify facets as well as non-facet metadata fields that have a limited range of values and can therefore be considered to be facets. A 'facet' word list may be created automatically from these values. Each line of the word list can include a value and a mapping to the fields where the value appears. The facet word list can be incorporated into the general FSM 512. When a facet value is tagged in the natural language search query 502, a condition can be generated to look for this value in the relevant metadata fields of the document repository.

In some embodiments, the tag module 508 can eliminate semantic ambiguity 534. For example, expressions such as "between August and September 1999" can be parsed two ways: "between ((August and September) 1999)" and "between (August and (September 1999)." The rule engine 532 can score the former tag when the tag is generated so that the former tag is preferred to the second tag. The scoring of a tag is described in greater detail below.

In some examples, conditions can include abstract constraints which can be transformed into a structured query language (SQL) condition to filter search results. For example, a condition can use tags to detect a date or date range that is to be transformed into a SQL condition statement. In some embodiments, conditions generated by the tag module 508 can be added to a temporary holding area, as indicated at block 536. Since generated conditions may not be compatible with each other, the conditions can be stored in the temporary holding area 536 for further processing. In some cases, a natural language search query 502 can be complemented with free text conditions. In this scenario, parts of the natural language search query 502 that could not be parsed into structured conditions are converted into free text conditions. Free text can be searched in all text fields or in specific fields. For example, a rule that triggers on "WORD/with; *; in_title;" can generate a condition to search for the wildcard words in the title or subject fields. In some examples, the tag module 508 removes stop words and boilerplate phrases that have been tagged. Removing boilerplate expressions may be performed using the same rule mechanism including creating a word list called "skip_verb.txt" containing phrases such as "I want," "please give me," "get," and the like. As another example, a word list called "skip_object.txt" containing phrases such as "the document," "email," "files," and the like may be created. In some cases, a word may be inserted at the beginning of the natural language search query 502 to enable conditions to be generated corresponding to the beginning of the natural language search query 502. Then, the rule "removeFreetext; WORD/^; skip_verb; skip_object;" may capture and remove a large number of boilerplate expressions from the beginning of the natural language search query 502. In one example, this rule may not actually remove the boilerplate phrases from the natural language search query 502. The boilerplate phrases are still available for other types of tagging and condition generation, but the boilerplate phrases may not be sent to a free-text search.

A tag module 508 can also generate a final condition structure 538. In one implementation, the final structure (also referred to as a query language statement) 538 can include multiple levels. A query to the repository may include different SQL queries, wherein each SQL query selects for a specific document class. Each of these SQL queries may have several AND clauses. In a third level, each item in an AND clause may have several conditions "ORed" together.

In some cases, compatible conditions may be generated from the temporary holding area 536. In some cases, heuristics for generating conditions may be implemented. For example, if there are several conditions found for the same docClass (e.g., "Document Class") attribute (or xpath), the conditions can be disjunctively combined. Otherwise, if a docClass has conditions based on different attributes, the conditions can be conjunctively combined. Furthermore, if two docClasses are related (one class is derived from the other class), an attempt is made to merge their conditions, and a single SQL query is generated on the most-derived object. In other words, least-derived docClasses attempt to "donate" their conditions to derived docClasses that have conditions. If such a donation could not be made, a separate SQL query is generated for those least-derived docClasses.

In some cases, a donation may not always be made, as the following example will illustrate. Consider a least-derived document class 'Document' with two derived classes, 'Email' & 'Record'. The Document class has the attribute 'Creator' while the Record class has the attribute 'DeclaredBy' and the Email class has the attribute 'From.' In this case donating 'Document' attributes to 'Email' does not violate any conditions or rules. The 'Document.Creator' and 'Record.DeclaredBy' attributes complement each other, so the conditions can be conjunctively combined. One example may be an SQL example: "SELECT d.* FROM Record d WHERE (d.Creator='alice') AND (d.DeclaredBy='bob')." However, conditions on 'Document.Creator' and 'Email.From' are incompatible. Although 'Email' is derived from 'Document', in some examples, one of these two fields can be populated, depending on whether a Document class instance or Email class instance is detected. Therefore a SQL query like "SELECT d.* FROM Email d WHERE (d.Creator='john') AND (d.From='john@my.com')" may fail, and this type of merger may not be allowed. The techniques described herein handle this issue by keeping a list of incompatible docClass_Attribute pairs. Incompatible conditions will not be joined into the same SQL query but will generate separate SQL queries (one for Document.Creator and another for Email.From).

In some cases, full queries can be composed from the condition structure. The structure can be converted to SQL statements appropriate and conforming to the document repository. The final results may be federated from the returned result sets. If no results are returned, or their score is low, it is possible to relax some of the conditions and try again. In some examples, the tag module 508 can specify a relaxed alternative for some of the conditions as the conditions are being generated. For example, the phrase "please show me the email I sent to John a week ago" can be relaxed in two ways. In a first way, the approximated range of "a week ago" may be expanded. In a second way, repository instances of "John," and not just instances which are in close affinity to the sender, may be queried, wherein the affinities were determined by static analysis 504 of the document repository. In some cases, it is also possible to take a condition that searches for a value in a specific field, and change the condition into a global free text search.

As referenced above, the tag module 508 can generate scores for tags and/or rules using scoring heuristics. In some embodiments, one aspect of the system is a weighting algorithm which is meant to enhance the shallow parser outcome. In some cases, facet scores may be boosted. When a value or enum alias is found in the search query 502, a condition may be generated that searches for the value in the appropriate document class attributes based on the static analysis 504 of the document repository. Heuristic scores can be generated based on various considerations. In some examples, the score can be based on whether the search query contains (beside the facet value) a "booster" tag that relates to the docClass or the docClass attribute where that facet appears. For example, the tag 'email' hints that the search can include fields that belong to the Email docClass. In some cases, closeness of a booster tag to the facet value in the search query may be a factor in generating heuristic scores. In this scenario, a close proximity may boost the condition's score. In some cases, whether there is more than one booster tag for this value may be a factor in generating heuristic scores.

Additional score boosters may take into account the following considerations: how much of the query is covered by structured metadata conditions; how much of the query is covered by free text conditions; how many condition terms are in the search query; the ranking returned by the free-text search; the existence of boosted terms found in the title over terms found in the body, how many results were returned by the SQL query; the depth of the docClass being searched, and the like. In some cases, queries that contain more condition terms, relate to a more specific docClass (a derived docClass rather than the generic Document docClass) and return a small number of results, can get an extra boost before they are federated into the final set of results. Further, the tag module 508 can begin with a restrictive set of conditions, and relax the conditions if no results or very low-scoring results are returned.

It will be appreciated that the embodiments described above and illustrated in the drawings represent only a few of the many ways of implementing embodiments of the present invention. The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., query module, tag module, condition module, etc.). These systems may include any types of monitors and input devices (e.g., keyboard, mouse, voice recognition, etc.) to enter and/or view information.

It is to be understood that the software (e.g., query module, tag module, condition module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., query module, tag module, condition module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., tags and conditions). The database system may be implemented by any number of any conventional or other databases, data stores or storage structures (e.g., files, databases, data structures, data or other repositories, etc.) to store information (e.g., tags and conditions). The database system may be included within or coupled to the server and/or client systems. The database systems and/or storage structures may be remote from or local to the computer or other processing systems, and may store any desired data (e.g., tags and conditions).

The present invention embodiments may employ any number of any type of user interface (e.g., Graphical User Interface (GUI), command-line, prompt, etc.) for obtaining or providing information (e.g., objects, fields, and values), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
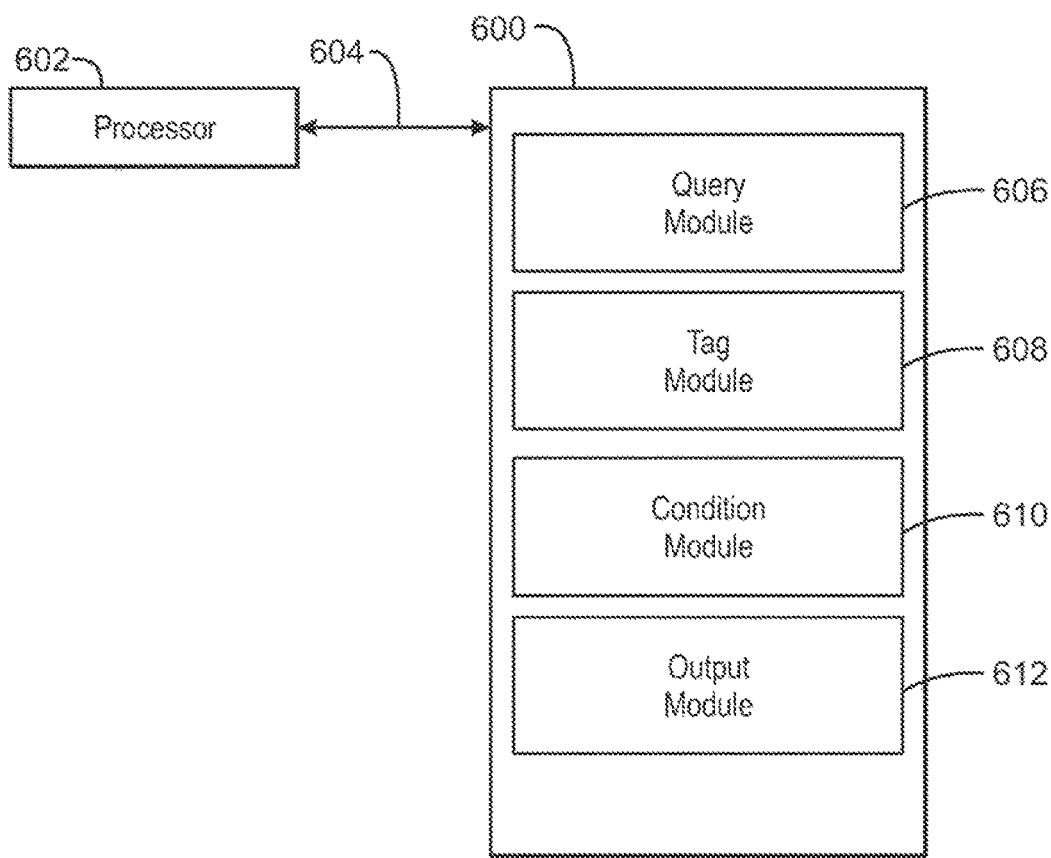
FIG. 6 is a tangible, non-transitory computer-readable medium that can generate a query language statement according to an embodiment described herein.

Referring now to FIG. 6, a block diagram is depicted of an example of a tangible, non-transitory computer-readable medium that can generate a query language statement. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the current method.

The various software components discussed herein may be stored on the tangible, non-transitory, computer-readable medium 600, as indicated in FIG. 6. For example, a query module 606 can detect a search query corresponding to a document repository. The search query can attempt to retrieve documents from the document repository based on words or conditions in the search query. In some embodiments, the tag module 608 can generate a modified search query by adding atomic tags to the search query, the atomic tags based on prior knowledge obtained by static analysis of the document repository and semantic rules. For example, the tag module 608 can analyze the document repository to detect prior knowledge, such as wordlists, which can include tags that indicate associations between terms in a search query and additional related terms. In some embodiments, the tag module 608 can also generate enriched tags based on combinations of the atomic tags and add the enriched tags to the modified search query. The enriched tags can be based on any suitable combination of atomic and enriched tags.

In some embodiments, the condition module 610 can generate a first set of conditions based on combinations of the atomic tags and enriched tags and generate a second set of conditions based on free-text conditions. The first set of conditions can correspond to terms in a search query that match atomic and/or enriched tags. The second set of conditions can correspond to terms in a search query that do not match atomic and/or enriched tags. In some example, the condition module 610 can also reconcile the first set of conditions based on identified contradictions. For example, the condition module 610 can detect that conditions violate a logical expression. Accordingly, the condition module 610 can indicate that a combination of conditions is invalid and is to be reorganized to reconcile a contradiction between conditions. In some embodiments, the second set of conditions is restricted to the parts of the query that are not covered by the first set of conditions, which can result in a more focused and accurate retrieval of the relevant documents.

In some embodiments, the output module 612 can generate the query language statements corresponding to the search query, the query language statements based on conditions and display, via the processor, a plurality of documents from the document repository that satisfy the query language statement. In some examples, the query language statements can be joined by a logical conjunction or logical disjunction to identify documents in the document repository that match the search query and are to be displayed.

It is to be understood that any number of additional software components not shown in FIG. 6 may be included within the tangible, non-transitory, computer-readable medium 600, depending on the specific application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for generating a query language statement comprising:
   a processor to:
      detect a search query corresponding to a document repository;
      generate a modified search query by adding atomic tags to the search query, the atomic tags being based on an entity list and semantic rules;
      generate enriched tags based on combinations of atomic tags and any previously identified enriched tags and add the generated enriched tags to the modified search query;
      generate a first set of conditions based on combinations of the atomic tags and the generated enriched tags and generate a second set of conditions based on free-text conditions, the second set of conditions to correspond to terms in the search query that are not associated with any of the first set of conditions;
      reconcile the first set of conditions based on identified contradictions;
      generate the query language statements corresponding to the search query, the query language statements based in part on the first set of conditions and the second set of conditions; and
      display a plurality of documents from the document repository that satisfy the query language statements, wherein
      the generating the query language statements comprises:
         joining at least two queries for documents of a same type with a logical disjunction or at least two queries for documents of a different type with a logical conjunction.

2. The system of claim 1, wherein the query language statements correspond to a score based on a characteristic of the search query.

3. The system of claim 2, wherein the score indicates that the search query references a field search term or a document search term, the score indicating a preference for search query language statements that correspond to the field search term.

4. The system of claim 1, wherein the entity list comprises prior knowledge obtained by static analysis of the document repository.

5. The system of claim 1, wherein the processor generates the semantic rules, each semantic rule indicating an action, the action comprising generating a new atomic or enriched tag or generating a condition.

6. The system of claim 5, wherein the processor:
   determines that results of the query language statement do not exceed a quality threshold;
   generates relaxation rules; and
   modifies the query language statements based on the relaxation rules.

7. A computer program product for generating a query language statement, the computer program product comprising a non-transitory computer readable storage medium having program instructions embodied therewith, the program instructions executable by a processor to cause the processor to:
   detect, via the processor, a search query corresponding to a document repository;
   generate, via the processor, a modified search query by adding atomic tags to the search query, the atomic tags based on prior knowledge obtained by static analysis of the document repository and semantic rules;
   generate, via the processor, enriched tags based on combinations of the atomic tags and any previously identified enriched tags and add the generated enriched tags to the modified search query;
   generate, via the processor, a first set of conditions based on combinations of the atomic tags and the generated enriched tags and generate a second set of conditions based on free-text conditions, the second set of conditions corresponding to terms in the search query that are not associated with any of the first set of conditions;
   reconcile, via the processor, the first set of conditions based on identified contradictions;
   generate, via the processor, the query language statements corresponding to the search query, the query language statements based in part on the first set of conditions and the second set of conditions; and
   display, via the processor, a plurality of documents from the document repository that satisfy the query language statements based on a score, wherein
   the program instructions further cause the processor to join at least two queries for documents of a same type with a logical disjunction or at least two queries for documents of a different type with a logical conjunction.

8. The computer program product of claim 7, wherein the score indicates that the terms of the search query correspond to more of the first set of conditions than the second set of conditions.

9. The computer program product of claim 7, wherein the program instructions cause the processor to identify the atomic tags from an entity list, the entity list comprising the prior knowledge obtained by static analysis of the document repository.

10. The computer program product of claim 7, wherein the program instructions cause the processor to generate the semantic rules, each semantic rule indicating an action, the action comprising generating a new atomic or enriched tag or generating a condition.

11. A system for generating a query language statement comprising:
   a processor to:
      detect a search query corresponding to a document repository;
      generate semantic rules, each semantic rule indicating an action, the action comprising generating a new atomic or enriched tag or generating a condition;
      generate a modified search query by adding atomic tags to the search query, the atomic tags being based on an entity list and the semantic rules;
      generate enriched tags based on combinations of atomic tags and any previously identified enriched tags and add the generated enriched tags to the modified search query;
      generate a first set of conditions based on combinations of the atomic tags and the generated enriched tags and generate a second set of conditions based on free-text conditions, the second set of conditions to correspond to terms in the search query that are not associated with any of the first set of conditions;
      reconcile the first set of conditions based on identified contradictions;
      generate the query language statements corresponding to the search query, the query language statements based in part on the first set of conditions and the second set of conditions; and
      display a plurality of documents from the document repository that satisfy the query language statements, wherein
      the generating the query language statements comprises:
         joining at least two queries for documents of a same type with a logical disjunction or at least two queries for documents of a different type with a logical conjunction.

12. The system of claim 11, wherein the query language statements correspond to a score based on a characteristic of the search query.

13. The system of claim 12, wherein the score indicates that the search query references a field search term or a document search term, the score indicating a preference for search query language statements that correspond to the field search term.

14. The system of claim 11, wherein the entity list comprises prior knowledge obtained by static analysis of the document repository.

15. The system of claim 11, wherein the processor:
   determines that results of the query language statement do not exceed a quality threshold;
   generates relaxation rules; and
   modifies the query language statements based on the relaxation rules.

16. A computer program product for generating a query language statement, the computer program product comprising a non-transitory computer readable storage medium having program instructions embodied therewith, the program instructions executable by a processor to cause the processor to:
   detect, via the processor, a search query corresponding to a document repository;
   generate, via the processor, semantic rules, each semantic rule indicating an action, the action comprising generating a new atomic or enriched tag or generating a condition;
   generate, via the processor, a modified search query by adding atomic tags to the search query, the atomic tags based on prior knowledge obtained by static analysis of the document repository and the semantic rules;
   generate, via the processor, enriched tags based on combinations of the atomic tags and any previously identified enriched tags and add the generated enriched tags to the modified search query;
   generate, via the processor, a first set of conditions based on combinations of the atomic tags and the generated enriched tags and generate a second set of conditions based on free-text conditions, the second set of conditions corresponding to terms in the search query that are not associated with any of the first set of conditions;
   reconcile, via the processor, the first set of conditions based on identified contradictions;
   generate, via the processor, the query language statements corresponding to the search query, the query language statements based in part on the first set of conditions and the second set of conditions; and
   display, via the processor, a plurality of documents from the document repository that satisfy the query language statements based on a score, wherein
   the generating the query language statements comprises:
      joining at least two queries for documents of a same type with a logical disjunction or at least two queries for documents of a different type with a logical conjunction.

17. The computer program product of claim 16, wherein the score indicates that the terms of the search query correspond to more of the first set of conditions than the second set of conditions.

18. The computer program product of claim 16, wherein the program instructions cause the processor to identify the atomic tags from an entity list, the entity list comprising the prior knowledge obtained by static analysis of the document repository.

* * * * *